United States Patent
Wystup et al.

(10) Patent No.: US 8,212,507 B2
(45) Date of Patent: Jul. 3, 2012

(54) PROCEDURES AND CONTROL SYSTEM TO CONTROL A BRUSHLESS ELECTRIC MOTOR

(75) Inventors: Ralph Wystup, Künzelsau (DE);
Helmut Lipp, Dörzbach-Hoheback (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 234 days.

(21) Appl. No.: 12/819,747

(22) Filed: Jun. 21, 2010

(65) Prior Publication Data
US 2010/0315027 A1 Dec. 16, 2010

(30) Foreign Application Priority Data

Jun. 24, 2009 (EP) .................................... 09163651
Jun. 18, 2010 (EP) .................................... 10166480

(51) Int. Cl.
*H02P 27/00* (2006.01)
(52) U.S. Cl. ............... 318/400.3; 268/801; 268/345; 268/722; 268/811; 268/341; 363/37; 363/17; 363/39; 363/40; 363/98.132; 399/88; 399/70; 310/198
(58) Field of Classification Search ............ 318/400.3, 318/268, 801–805, 811, 345, 341, 722, 723, 318/727, 305, 800; 363/37, 17, 39, 40, 98.132; 399/70, 88; 310/198
See application file for complete search history.

(56) References Cited

U.S. PATENT DOCUMENTS

| | | | | |
|---|---|---|---|---|
| 4,855,652 A | * | 8/1989 | Yamashita et al. | 318/268 |
| 6,069,810 A | * | 5/2000 | Wissmach et al. | 363/132 |
| 2002/0089303 A1 | * | 7/2002 | Aiello et al. | 318/727 |

FOREIGN PATENT DOCUMENTS

JP 5-717292 A 10/1982

OTHER PUBLICATIONS

Verlustarmer Umrichter ohne Zwischenkreis-Kondensator, B. Piepenbreier and L. Sack, Elektronick 2006 No. 1, pp. 61-67.

* cited by examiner

*Primary Examiner* — Walter Benson
*Assistant Examiner* — Jorge L Carrasquillo
(74) *Attorney, Agent, or Firm* — Brinks Hofer Gilson & Lione

(57) ABSTRACT

The present invention relates to a method and a control system for driving a three-strand brushless, electronically commutated electric motor (2), wherein a line AC voltage ($U_N$) is rectified and fed via a slim DC link (8) with minimum DC link reactance as a DC link voltage ($U_Z$) to an inverter (10) that can be driven to supply and commutate the electric motor (2). A pulsating DC voltage ($U_G$) initially generated by rectifying the line AC voltage ($U_N$) is dynamically increased with respect to its instantaneous values by a step-up chopper (18) in such a manner that the resulting DC link voltage ($U_Z$) with a reduced ripple always lies above a defined limit voltage ($U_{18}/U_1$) over time. The control system consists of a network rectifier (6), a downstream slim DC link (8) with minimum DC link reactance and a controllable inverter (10) that can be supplied via the DC link and driven to commutate the electric motor (2). A step-up chopper (18) is integrated therein with a controller (20) designed in such a manner that, the pulsating DC voltage ($U_G$) rectified by the network rectifier (6) is dynamically increased with respect to its instantaneous values in such a manner that the resulting DC link voltage ($U_Z$) with a reduced ripple always lies above a defined limit voltage ($U_{20}/U_1$) over time. Stray inductances (Ls1-Ls3) of the motor winding heads present in the electric motor (2) are used as inductor (L) for the step-up chopper (18).

11 Claims, 10 Drawing Sheets

| Raumzeiger | Länge des Raumzeigers im statorfesten Koordinatensystem | Winkel des Raumzeigers | Schalterstellung | T7 | T8 | T9 |
|---|---|---|---|---|---|---|
| R0 | 0 | --- | | 1 | 1 | 0 |
| R1 | $U_d$ | 0 | | 1 | 1 | 0 |
| R2 | $U_d$ | $\frac{\pi}{3}$ (60°) | | 1 | 1 | 0 |
| R3 | $U_d$ | $\frac{2\pi}{3}$ (120°) | | 1 | 1 | 0 |
| R4 | $U_d$ | $\pi$ (180°) | | 1 | 1 | 0 |
| R5 | $U_d$ | $\frac{4\pi}{3}$ (240°) | | 1 | 1 | 0 |
| R6 | $U_d$ | $\frac{5\pi}{3}$ (300°) | | 1 | 1 | 0 |
| R7 | 0 | --- | | 0 | 0 | PWM |

Fig.7

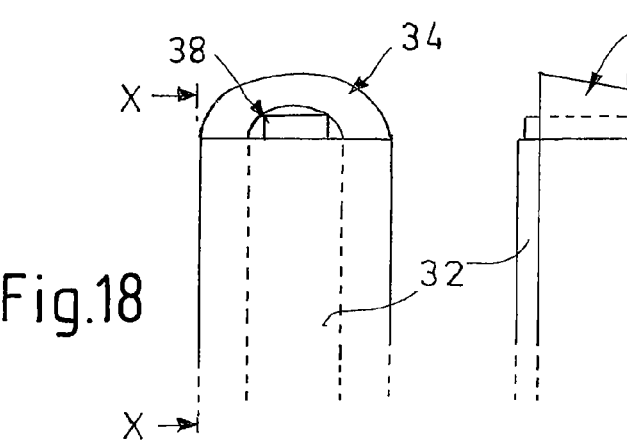
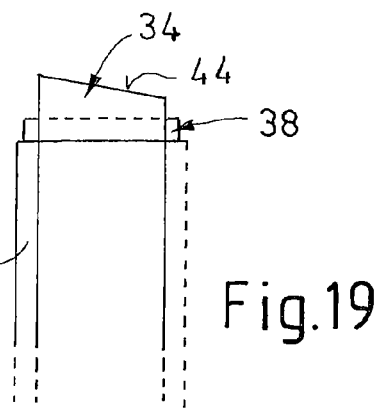
Fig.18  Fig.19
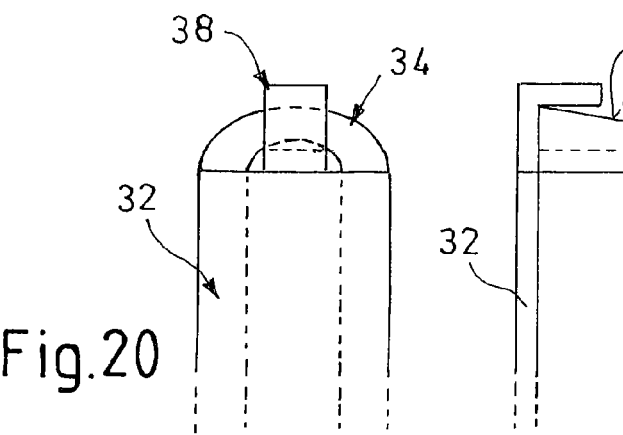
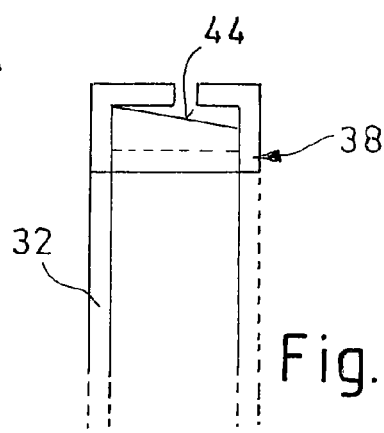
Fig.20  Fig.21
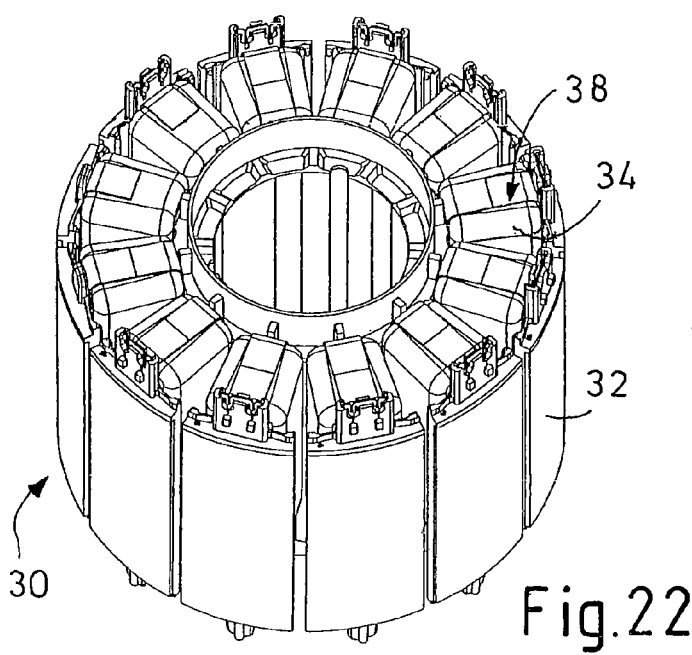
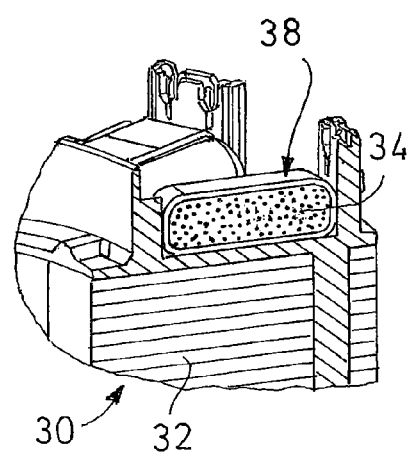
Fig.22  Fig.23

PROCEDURES AND CONTROL SYSTEM TO CONTROL A BRUSHLESS ELECTRIC MOTOR

CROSS REFERENCE TO RELATED APPLICATIONS

This application claims priority to European patent application number 09163651.4, filed Jun. 4, 2009 and European patent application number 10166480.3, filed Jun. 18, 2010.

FIELD OF THE INVENTION

The present invention first relates to a method for driving a brushless, electronically commutated electric motor, a three-strand motor in particular, wherein an AC line voltage is rectified and fed via a slim DC link with minimum DC link reactance as a DC link voltage to an inverter that can be driven to supply and commutate the electric motor.

The invention further relates to a corresponding control system using, in particular, the method of the invention, with a network rectifier, a downstream slim DC link with minimum DC link reactance, and a controllable inverter that can be supplied via the DC link and driven to commutate the electric motor.

BACKGROUND OF THE INVENTION

Electronically commutated motors, known as EC motors, are often used for driving fans. These drives generally consist of a permanent magnet synchronous motor (PMSM) with integrated power and signaling electronics. They are often external rotor motors.

Such electric motors can be operated with a single phase or three-phase line AC voltage by initially rectifying the line AC voltage into a DC link voltage, which is then converted via a controlled inverter into a motor operation voltage for supplying and commutating the motor.

To achieve an optimally uniform, constant motor torque with minimum ripple and thereby favorable noise behavior (particularly for fan drives), the DC link voltage should be as constant a DC voltage as possible. Until now the rectified, strongly pulsating DC voltage was smoothed by means of at least one smoothing capacitor and optionally an additional filter choke. For this purpose, the smoothing capacitor must actually have a rather high capacitance (e.g. several hundred μF), so that electrolytic capacitors are typically used. In practical use, the latter have certain disadvantages, however, particularly a large overall size and a short lifetime.

Therefore there is an increasing tendency today, either to do without smoothing capacitors at all, or at least to forgo electrolytic capacitors, in which case longer-lived film capacitors with a lower capacitance (only up to a few μF) are used. This is called a "slim DC link," wherein a decoupling of the line and motor sides by means of storage components such as capacitors and coils (reactors) is forgone completely or at least to a large extent. This means that a slim DC link contains either no DC link reactance or only a minimum amount.

Problems appear with this "slim DC link" technology, especially in case of a supply from a single phase line, since the rectified DC voltage pulsates very strongly at a frequency of, for example, 100 Hz with a voltage curve corresponding to the sinusoidal line AC voltage. If an EC motor (PMSM) were supplied directly with such a strongly pulsating DC voltage, then no motor current could be impressed into the motor windings below a certain limit voltage. The consequence would be a torque drop.

Several possibilities for keeping the torque as constant as possible despite the rippling DC link voltage are known.

Thus, the torque can be kept constant by regulating the current. The disadvantage in this case is that the motor currents have to be detected to accomplish this, and that an excessively fast current regulation can induce a system consisting of a system inductance and a DC link capacitor to oscillate. The result would be an even more pulsating DC link voltage.

The use of controlled rectifiers in combination with the inverter of the EC motor is also known (cf. for example the literature citation "Low-loss inverter without DC link capacitor (German: Verlustarmer Umrichter ohne Zwischenkreis-Kondensator)" by B. Piepenbreier and L. Sack in "Elektronik 2006 No. 1", pp. 61-67). This is concretely implemented by special matrix converters with controlled rectifiers. The disadvantage of this in principle well-functioning arrangement is the extra cost due to the additional controllable semiconductors, which becomes noticeable particularly in large series production.

The document JP 57177292 A relates to a torque control system for a collectorless DC motor, wherein a step-up chopper as well as a step-down chopper are arranged in a DC link in order to make the pulsating DC voltage more uniform. To accomplish this, the voltage is reduced by the peak voltage at certain times and by zero at other times. This document is only concerned with torque control and not with the technology of a "slim DC link," particularly since a smoothing capacitor and an additional inductor are provided in the DC link, so that one cannot speak of a "slim DC link."

The same applies to document U.S. Pat. No. 4,855,652 A, according to which a step-up chopper in the DC link is also provided with an additional inductor.

Finally, the publication US 2002/0089303 A1 also describes a driver circuit for an electronically commutated motor with a step-up chopper for a rectified pulsating voltage, wherein the step-up chopper, called an "energy return stage", there consists of a capacitor, a switching element and a series circuit of an inductor and a diode. Here as well, the special technology of a "slim DC link" is not addressed.

The present invention is based on the problem of optimizing an electronically commutated electric motor (EC motor), especially one with a "slim DC link," in a technically favorable manner and by simple and inexpensively realizable means.

This is achieved according to the invention by a method in accordance with this invention. A control system suitable for applying the method is also the subject matter of this invention. Advantageous embodiments of the invention are also specified in the description below.

According to the invention the pulsating DC voltage, i.e. a voltage that is not constant over time, that was initially generated by rectifying the line AC voltage is dynamically increased with respect to its instantaneous values using a step-up chopper in such a manner that the resulting DC link voltage with reduced ripple always lies above a defined limit voltage over time. The voltage that is sufficient for the respective electric motor to be always able to impress a motor current onto the windings via the inverter over the entire phase curve is specified as the limit voltage. With a suitable design of the step-up chopper and its controller, a nearly constant DC voltage can advantageously be generated from the strongly pulsating DC voltage. For this purpose, the pulsating DC voltage is connected to an inductor at a pulse duty ratio regulated on the basis of the respective current DC link voltage, and added up via a freewheeling diode and a DC link capacitor downstream of the inductor. A simple and inexpensive film capacitor of the order of only a few µF is sufficient for the DC link capacitor.

Since the inductance required for the functioning of the step-up chopper actually contradicts the "philosophy of a slim DC link," it is further provided according to the invention that stray inductances of the motor winding heads, which are necessarily present in any case, are used as the inductor for the step-up chopper. In this manner an additional inductor can be eliminated in the slim DC link in contrast to the above-explained prior art according to JP 57177292 A, U.S. Pat. No. 4,855,652 A and US 2002/0089303 A1. To be able to use the stray inductances of the motor for the step-up chopper, a step-up chopper operation is performed only in the phases in which all windings of the electric motor are short-circuited while the commutation is being controlled by the inverter. In the remaining phases of the commutation control, the torque generation is controlled in the ordinary manner by space vector modulation to generate a rotary field.

A control system according to the invention first of all consists of the ordinary components of an EC controller, specifically a network rectifier and an inverter connected downstream via a DC link that is used to generate quasi-sinusoidal motor currents for a corresponding voltage clocking (modulation) of a PWM controller. According to the invention, the control system has an integrated step-up chopper with a controller designed in such a manner that, in terms of the method according to the present invention, a pulsating DC voltage rectified by the network rectifier is dynamically increased relative to its instantaneous values in such a manner that a resulting DC link voltage with reduced ripple always lies above a defined limit voltage over time. The step-up chopper has an inductor in series with a freewheeling diode and a downstream DC link capacitor, wherein the inductor is clocked with a pulsating DC voltage via a controllable electronic switch. The electronic switch for clocking the inductor is driven with pulse width modulation by a voltage regulator with variable clock frequency, specifically as a function of the respective current DC link voltage and a predetermined limit voltage. The controller activates the step-up chopper only in the phases of commutation in which all windings of the electric motor are short-circuited. In that way, the stray inductances of the motor winding heads can be used as the inductor for the step-up chopper.

The stray winding head inductances used according to the invention for the step-up chopper inductance depend, with respect to the size of their effective inductance, on the design of the respective electric motor or its stator and its stator windings. In an advantageous refinement of the invention, however, the stray inductances of the motor winding heads can be influenced, specifically, reduced or increased, by additional measures with respect to their effective inductance. For this purpose, magnetically active means with higher or lower magnetic permeability can be provided at least on one axial side of the motor or stator in order to influence the actually existing air gap permeability and the magnetic flux leakage. Some concrete examples of these measures will be described in more detail below.

BRIEF DESCRIPTION OF THE DRAWINGS

The invention will hereinafter be described in detail with reference to the drawings. The drawings show:

FIG. 7 is a table with switching states for commuting the electric motor by space vector modulation to form a rotary field, FIG. 12-27 are exemplary views explaining possible additional measures for influencing the stray inductances of the winding heads, specifically:

FIG. 12 is a schematic perspective view of a stator of the electric motor in a first embodiment for influencing the stray inductances of the winding heads, FIG. 13 is an exploded view of FIG. 12, FIG. 14 is an alternative to FIG. 12, FIG. 15 is an exploded view of FIG. 14, FIG. 16 is a diametrical axial section through the stator according to FIG. 14, FIG. 17 is a view onto an inner side of a component of the embodiments according to FIGS. 14 to 16, FIG. 18 is a schematic side view with a view direction radially from the outside onto the stator in the area of one of the stator windings, FIG. 19 is a view along X-X of FIG. 18, FIG. 20, 21 are views analogous to FIGS. 18 and 19 in a refinement, FIG. 22 is a perspective view of the stator in an embodiment corresponding to FIGS. 20 and 21, FIG. 23 is a radially sectioned and enlarged detail view of FIG. 22, and FIGS. 24-27 are each a schematic radial section through the winding head in the area of one of the stator windings in various embodiments.

Identical parts, components and dimensions are always provided with identical reference numerals in the various figures of the drawing.

DETAILED DESCRIPTION OF THE INVENTION

Figure 1:
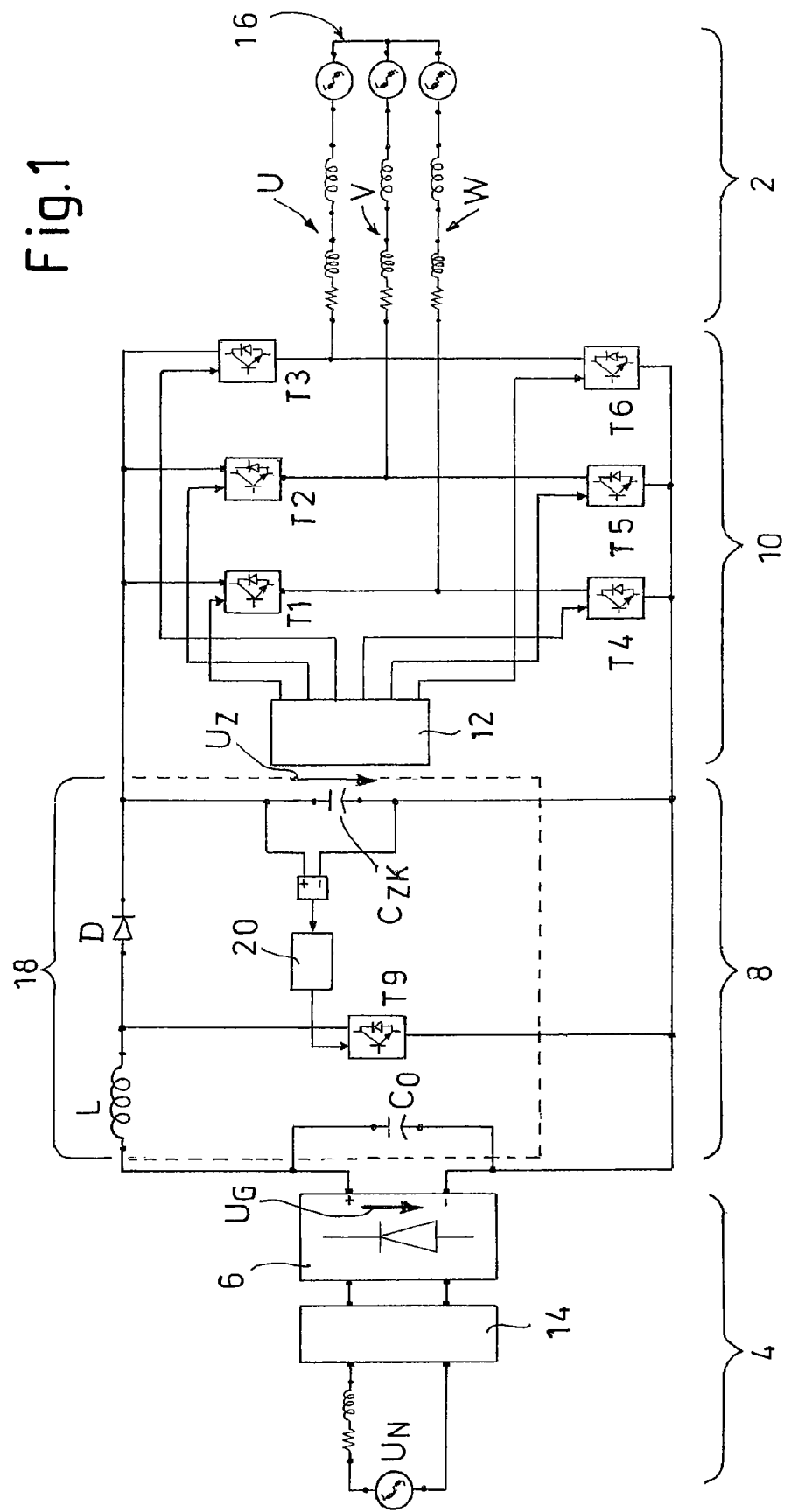
FIG. 1 is a circuit diagram of the control system with integrated step-up chopper.

As follows from FIG. 1, a control system for driving a collectorless electronically commutated electric motor (EC-PMSM=electronically commutated permanent magnet excited synchronous motor) consists of a line voltage supply 4 that rectifies a line AC voltage $U_N$ via a network rectifier 6 into a pulsating DC voltage $U_G$ (cf. the diagram in FIG. 2). Via a DC link 8, the line voltage supply 4 feeds a controlled inverter 10 (power output stage), which is controlled in a known manner by a control unit 12 for supplying and commutating and, in particular, also for adjusting the speed of the motor 2.

A line filter 14 in the vicinity of the line voltage supply 4 that reduces high-frequency current oscillations, and thus improves the electromagnetic compatibility (EMV), is drawn in FIG. 1. Only three stator windings U, V, W of the, preferably three-strand, electric motor 2 are shown in an equivalent circuit representation, a star connection with a shared star point 16 being provided in this case. Other components of the electric motor 2 such as its permanently magnetized rotor are not shown in the drawings for the sake of simplicity. The inverter 10 consists of a bridge circuit (three-phase full bridge) with six electronic switches T1-T6.

Figure 2:
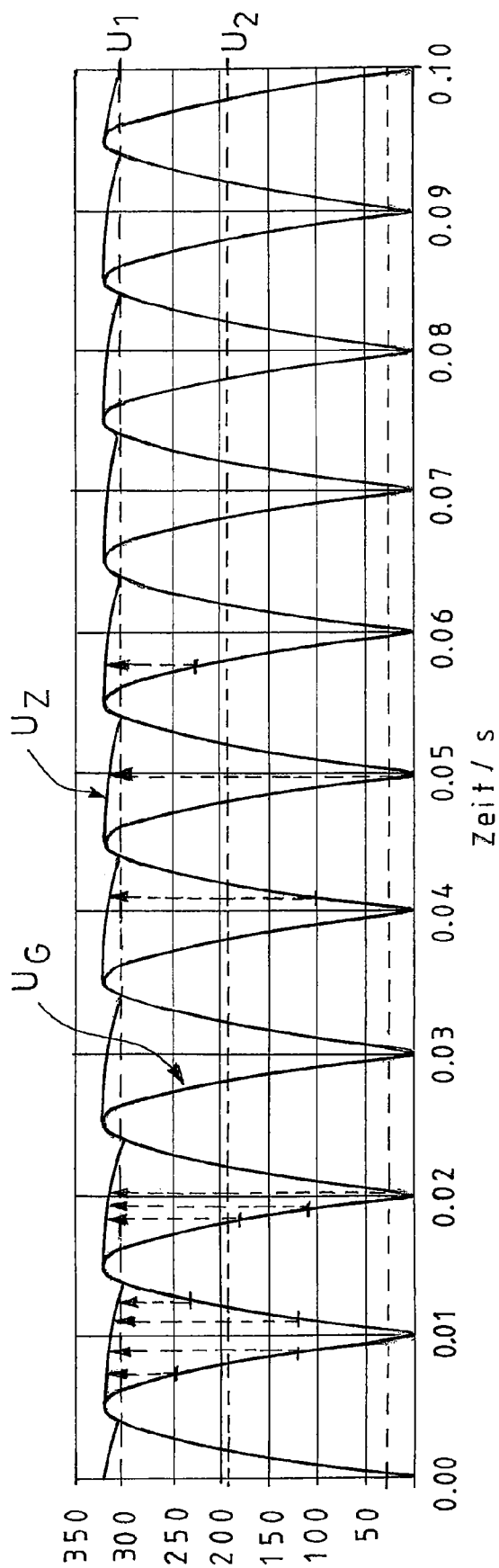
FIG. 2 is a voltage diagram for a functional description.

According to the invention, the control system has a step-up chopper 18 (frequently also called a step-up converter) that is integrated into the DC link 8 and converts the strongly pulsating DC voltage $U_G$ into a nearly constant DC link voltage $U_Z$ containing only a slight residual ripple for supplying the inverter 10 (cf. FIG. 2). For this purpose, the instantaneous values of the pulsating DC voltage $U_G$ are increased dynamically via the step-up chopper 18 (indicated by some dash-line arrows in FIG. 2) to such an extent that the resulting DC link voltage $U_Z$ with reduced ripple always lies above a defined limit voltage over time. Two different limit voltages $U_1$ and $U_2$ are drawn in with dash-lines in FIG. 2. The respective limit voltage is specified motor-specifically; it is the minimum voltage which is necessary to impress a motor current in motor 2 over time.

Figure 3:
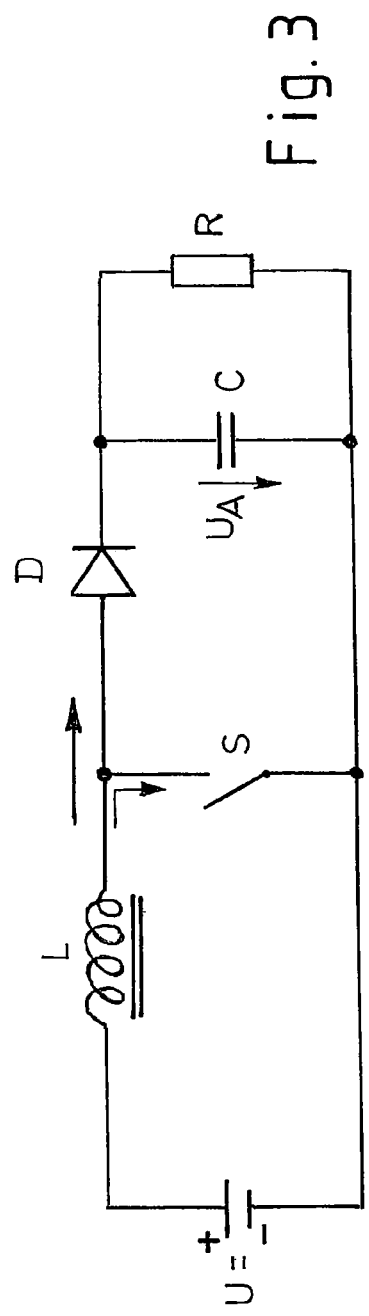
FIG. 3 is a simplified schematic diagram to explain the step-up chopper function.

The general functional principle of a step-up chopper or step-up converter will be described based on FIG. 3. It is in principle a DC-DC converter that can transform a DC voltage $U_=$ into a higher output voltage $U_A$. For this purpose an inductor (coil) L is connected in series to a freewheeling diode D, downstream of which a charging capacitor C sums up the output voltage $U_A$. The inductor L is connected at a defined clock frequency to the DC voltage $U_=$ via a switch S in an alternating manner, energy being each time stored in the inductor L. If the switch S is opened, the inductor L maintains the current flow, so that the charging capacitor C is charged via the diode D to the output voltage $U_A$ for supplying a load R.

In the case of the control system according to the invention and its integrated step-up chopper 18, however, it is provided beyond the general functional principle that the existing electronic switch T9 is controlled by a voltage regulator 20 in a particular manner, specifically with a PWM clocking which is variable with respect to the clock frequency, wherein the clock frequency is controlled as a function of the temporally nonconstant curve of the pulsating DC voltage $U_G$ and of the respectively detected actual value of the DC link voltage $U_Z$, as well as by the predetermined limit voltage $U_1$ and/or $U_2$ in such a manner that the pulsating DC voltage $U_G$ is dynamically raised relative to its instantaneous value in such a manner that the resulting DC link voltage $U_Z$ always lies above the respective limit voltage $U_1/U_2$.

For the summing storage of the DC link voltage $U_Z$, a DC link capacitor $C_{Zk}$ is arranged downstream of the freewheeling diode D. A second capacitor $C_0$ is preferably situated directly downstream of the network rectifier 6. The total capacitance of the two parallel capacitors $C_0$ and $C_1$ in the control system with the step-up chopper 18, however, is markedly smaller than a capacitance that would be necessary to keep the DC link voltage $U_Z$ above the respective limit voltage $U_1/U_2$ without the step-up chopper 18 according to the invention. The capacitor $C_0$ at the output of the network rectifier 6 serves for better controllability of the step-up chopper 18 and lies in the range of only a few μF.

In the embodiment according to FIG. 1, the reactance in the DC link 8 is increased by the inductor L located in the DC link 8. This actually contradicts the fundamentally desired "slim DC link," which is intended to contain as small a reactance as possible.

Figure 4:
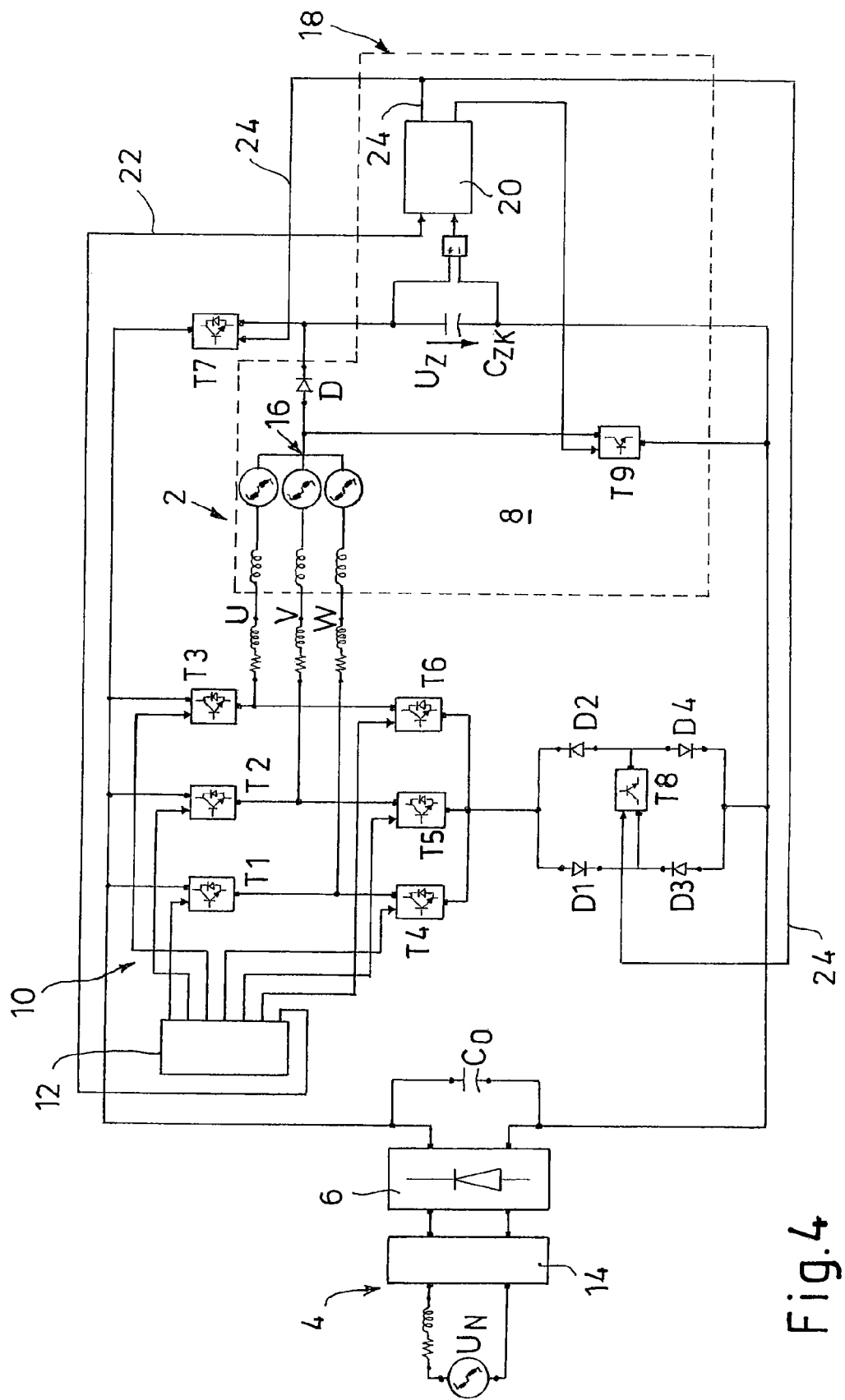
FIG. 4 is a circuit diagram of an embodiment of the control system according to the invention.

It is therefore provided, as shown in FIG. 4, according to the invention to realize the step-up chopper 18 with the stray inductance of the winding heads of the motor windings, which is present in any case in motor 2. Thereby additional inductors in the DC link 8 can advantageously be omitted, whereby the DC link reactance is advantageously kept low.

The general approach for this embodiment according to the invention can be defined as storing magnetic energy in the stray inductances of the winding heads of the stator in order to then use them for boosting the DC link voltage $U_Z$.

This embodiment as well as its technical background will now be explained in more detail with reference to FIGS. 4-11.

Figure 5A:
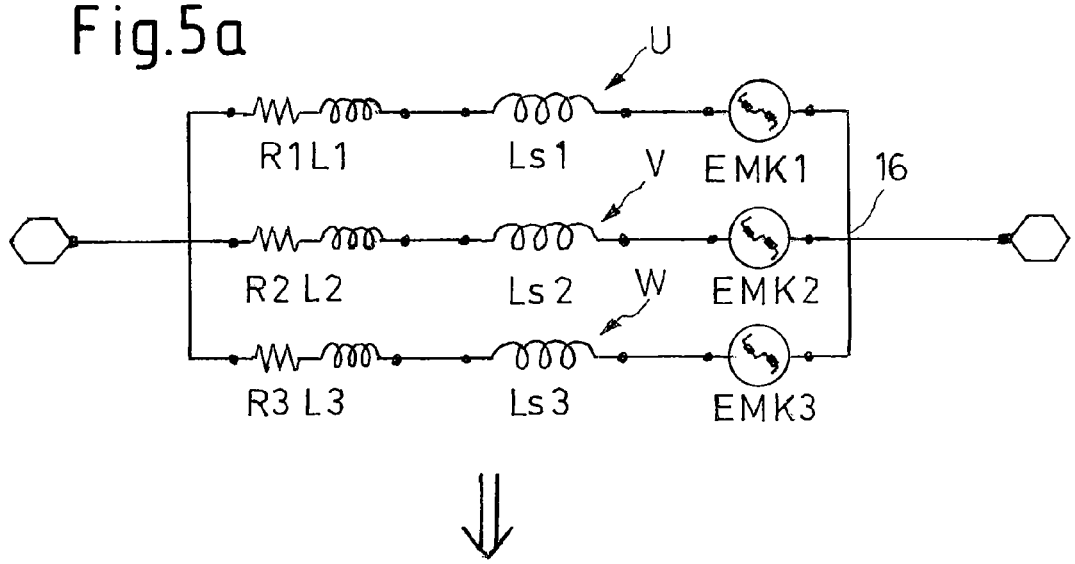
FIG. 5 is equivalent circuit diagrams of the three-strand motor winding in a short-circuited state.
Figure 5B:
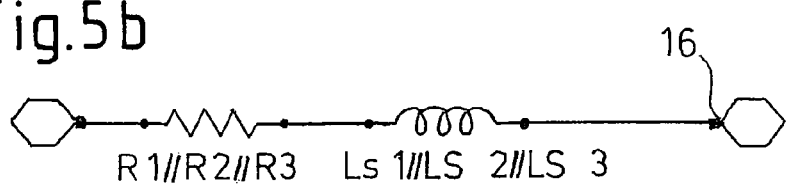
Figure 6:
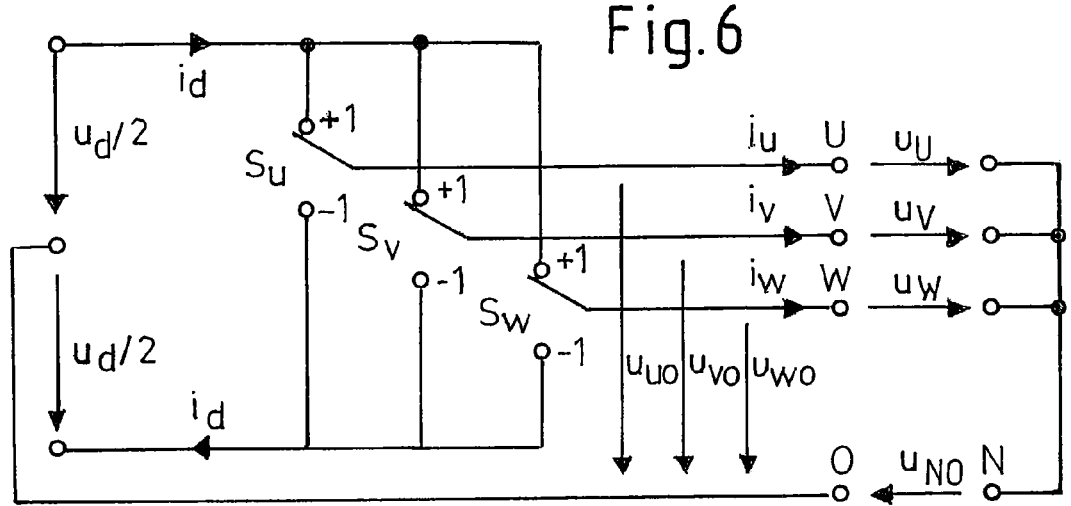
FIG. 6 is a schematic circuit diagram of a rectifier in an equivalent switch representation.

The three-stranded electric motor 2 is shown in FIG. 4 (as well as in FIG. 1) as an equivalent circuit diagram with its winding impedances R1, L1, Ls1 through R3, L3, Ls3 as well as with the induced electromotive forces EMK1 to EMK3. The winding impedances are divided into a symmetric component L1 to L3 and an asymmetric component Ls1 to Ls3. If the winding strands are short-circuited with their terminals, then only the asymmetric component of the parallel winding inductances, mainly caused by the stray inductances of the winding heads, can be measured at the star point 16. The symmetric inductances are eliminated, since their magnetic fluxes cancel one another out if the terminals are short-circuited. This situation is shown in FIG. 5. FIG. 5a shows all three winding strands with their respective impedances and electromotive forces. The equivalent circuit diagram shown in FIG. 5b is effectively created by short-circuiting the winding strands, wherein only the ohmic components R1 to R3 and the stray inductances Ls1 to Ls3 are active. The other components cancel one another out.

According to the invention, the component of the stray inductances Ls1 to LS3 according to FIG. 5b is to be used as an inductor L for the step-up chopper 18.

For this purpose, it is provided according to the invention that the step-up chopper 18 is operated only in the phases of the commutation control of the inverter 10 in which all winding strands U, V, W of the electric motor 2 are short-circuited via the corresponding switches T1 to T6 of the inverter 10. In the other remaining phases of the commutation control ordinary driving by the inverter 10 takes place for torque generation by means of ordinary space vector modulation to generate a rotary field.

In order to provide these interlaced operating phases, the control system can be configured according to the exemplary embodiment shown in FIG. 4. In comparison to the embodiment according to FIG. 1, it is additionally provided in FIG. 4 that the control unit 12 of the inverter 10 activates the voltage regulator 20 of the step-up chopper 18 via an additional control line 22 in the commutation phases in which the winding strands U, V, W are short-circuited. In these phases, the inverter 10 is additionally disconnected via a switch T7 from the DC link 8. In the illustrated embodiment, the inverter 10 is also separated from ground via a switch T8 because of the freewheeling diodes parallel to the switches T4-T6 formed of bipolar transistors. The switch T8 is configured as a single-pole switch. In the illustrated embodiment, an ordinary bipolar transistor with a diode bridge D1 to D4 is provided as switch T8. This special circuitry can be eliminated if a single pole switch without freewheeling diodes, in particular a FET, is used at this position. Moreover, the switch T8 could also be completely omitted if single pole switches (such as FETs) are used directly for the "lower" switches T4 to T6 of the inverter 10. For the normal commutation operation, the voltage regulator 20 for the step-up chopper 18 is deactivated via the control line 22, and the DC link voltage of the DC link capacitor $C_{Zk}$ is connected via the switch T7 and optionally the switch T8 to the inverter 10. The switch T7 and optionally T8 are preferably controlled via a control line 24 by the voltage regulator 20, depending on its operating state, For the sake of completeness, the mode of operation of the ordinary commutation control by means of space vector modulation, which serves to generate a three-phase rotary field system in order to set the electric motor or its rotor into rotation, will now be described. For that purpose, the switches T1 to T6 from FIG. 4 are replaced by the changeover switches Su, Sv, Sw in FIG. 6. These changeover switches and the additional switches (transistors) T7 to T9 according to FIG. 4 can assume the states according to FIG. 7. In this manner, rotating voltage space vectors R0 to R7 are generated.

If the switch combinations according to R1 to R6 are successively switched, a so-called rotary vector also referred to as a space vector, for the strand voltages in the stator-fixed Cartesian coordinate system can be formed by spatially arranging the winding strands. This voltage space vector starts to rotate abruptly and is the cause of a current space vector in the motor windings, which forms a rotary magnetomotive force. Together with the rotary field of the rotor, this rotary magnetomotive force forms the air gap torque driving the motor.

Figure 8:
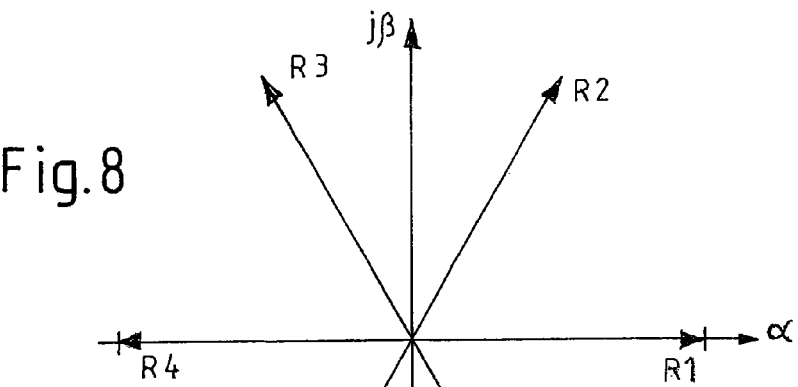
FIG. 8 is a diagram for representing space vectors from FIG. 7 in a stator-fixed Cartesian coordinate system.

The corresponding voltage space vectors for the switch states R1 to R6 are shown in FIG. 8. The two space vectors R0 and R7 according to FIG. 7 do not form a rotary field and run perpendicular to the drawing plane in FIG. 8 through the origin of the coordinate system.

Since only one space vector is active at any point in time, a discontinuous space vector initially arises from switching, which creates a hexagonal rotary field (connection of all vector tips) that would cause an undesirable torque ripple.

Figure 9:
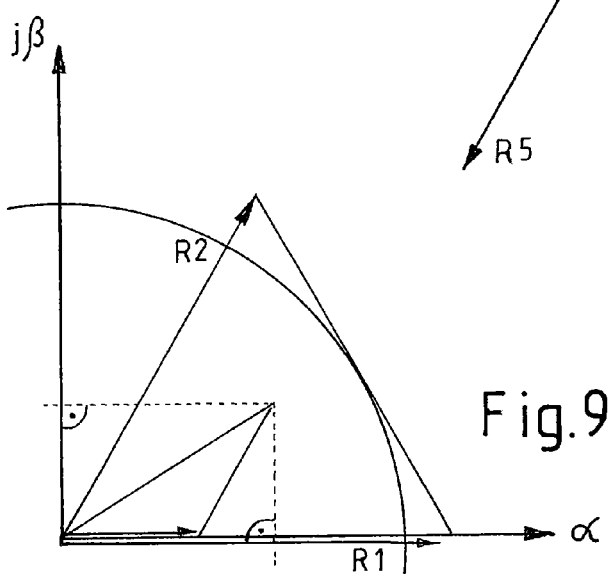
FIG. 9 is a diagram as in FIG. 8 for further explanation of the formation of a circularly rotating space vector.
Figure 10:
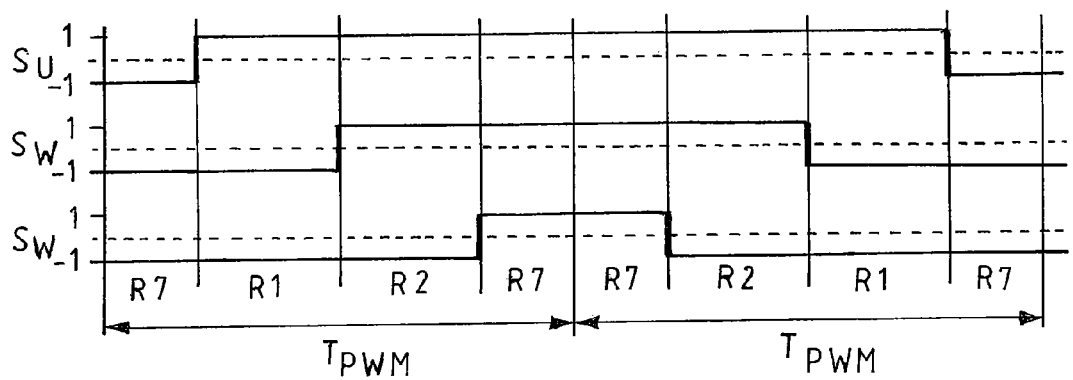
FIG. 10 is a control diagram of a possible switching sequence for a space vector.

To generate a constant torque, the space vector must be circular without discontinuities. This is achieved by forming a resultant vector from two respectively adjacent space vectors, the so-called elementary vectors that runs on a circular path. A resultant space vector is formed by switching the adjacent elementary vectors on or off quickly, thus forming a resultant space vector in the arithmetic mean. This process is illustrated in FIG. 9. A typical switching sequence for forming a revolving space vector is, for example, illustrated in FIG. 10.

According to the invention, only the zero vector R7 is required for the step-up chopper 18. In principle, however, the zero vector R0 could be used additionally or alternatively.

Thus, it is advantageously possible to integrate additional functions, such as the operation of the step-up chopper 18 in particular, into the time interval in which the zero space vector R7 is active, without disrupting the generation of a circular rotary field. The condition for this is that all processes originating from the step-up chopper 18, particularly the current flow through the short-circuited motor windings and the resulting magnetic load, have ended before the beginning of the rotary field-forming space vector states.

Figure 11:
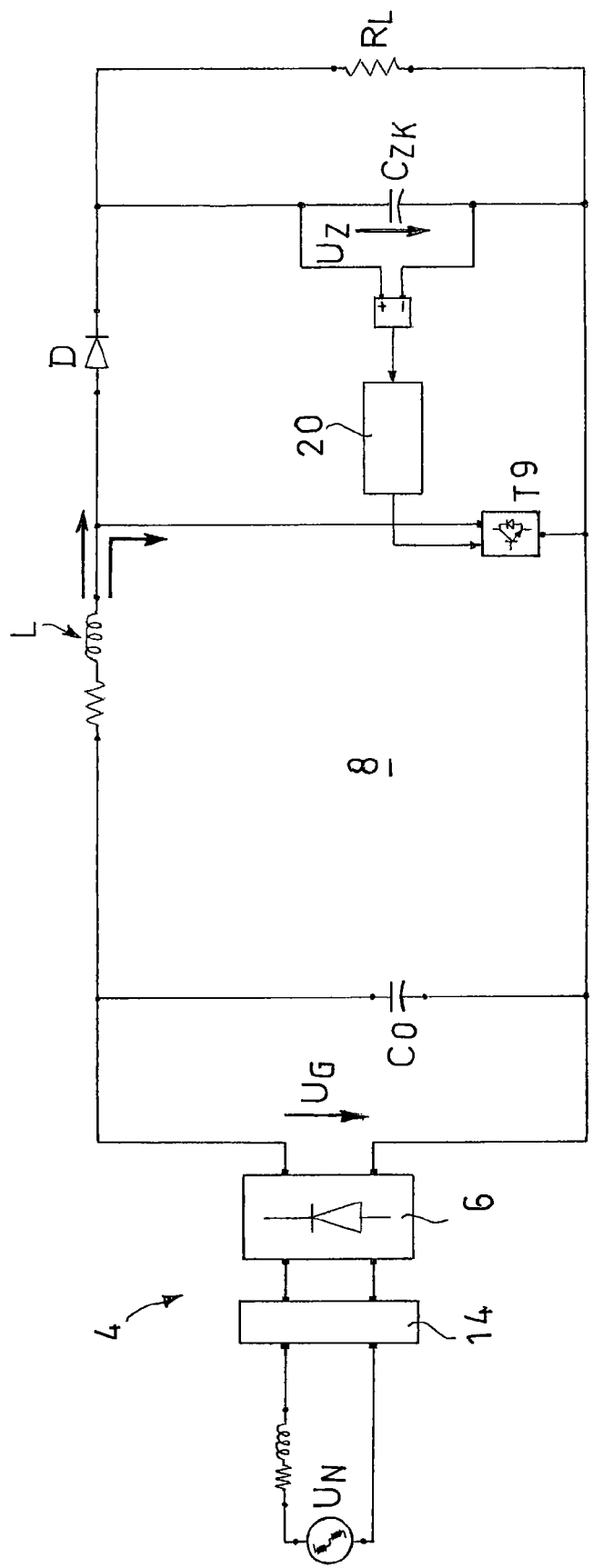
FIG. 11 is a circuit diagram of the control system according to the present invention, strongly simplified in comparison to FIG. 4, in the step-up chopper mode (short-circuit phase of the windings)

In order to clarify the function of the step-up chopper 18 according to FIG. 4 in the space vector state R7, the circuit in FIG. 11 is drawn in this state. For simplicity, only the components active in this phase are illustrated. Since the switches T7 and T8 are permanently turned off in this phase, the inverter 10 with the upper and lower switches T1 to T3 and T4 to T6 is also disconnected from the DC link 8. Then, only the equivalent circuit of the short-circuited windings according to FIG. 5b is present in the DC link 8, and thereby forms the inductor L for the step-up chopper 18 The switch T9 is driven PWM clocked by the voltage regulator 20 in the above described manner, so that the DC link voltage $U_Z$ at the DC link capacitor $C_{Zk}$ can be controlled by means of the step-up chopper 18 in a certain range. The load resistor $R_L$ additionally drawn in FIG. 11 basically represents the motor by loading the capacitor $C_{Zk}$ similarly to the way in which the motor would load the DC link 8 during the rotary field-forming space vector states R1 to R6. During the rotary field-forming states, the step-up chopper 18 is inactive and the DC link capacitor $C_{Zk}$ then supplies the motor via the turned-on switches T7 and T8.

By means of the above-described embodiment according to the invention, the step-up chopper 18 can advantageously be used independently of the regular rotary field generation in order to raise the DC link voltage above a critical value and thus reduce the ripple of the DC link voltage with reduced reactances in the DC link.

In a refinement of the invention, the stray inductances of the winding heads can be "artificially" influenced, specifically increased or decreased, for example by arranging ferrite elements (plates) in the winding head area, e.g. inserting them radially. Some examples of measures for influencing the stray inductances will be explained with reference to FIGS. 12 to 23.

A stator 30 of the electric motor 2 is illustrated in FIGS. 12 to 23. The stator 30 typically consists of a ferromagnetic stator core 32, which is generally implemented as a lamination stack, and motor windings 34 that are wound in grooves of the stator and form winding heads running outside the stator core 32 over its end faces. These areas of the motor windings produce the above-described stray inductances of the winding heads.

Since all strands are short-circuited at their beginnings and ends in the use of the winding heads of the motor windings 34 are used according to the invention as inductors for the step-up chopper 18, an approximately equal current flows through all strands. This results in a compensation of the fields in the ferromagnetic stator core 32 and only stray inductances of the winding heads of the strands, connected in parallel, reach the exterior as resultant inductances for the step-up chopper 18. For a proper operation of the step-up chopper 18 in the time intervals of the space vector state R7 (upper zero vector), however, it is advantageous if the resultant inductance lies within certain limits in order to obtain a sufficiently large energy throughput, and thus possible output power. Some possibilities for influencing the stray inductances, which can vary depending on the design of the stator and the motor windings, will be explained below.

Figure 12:
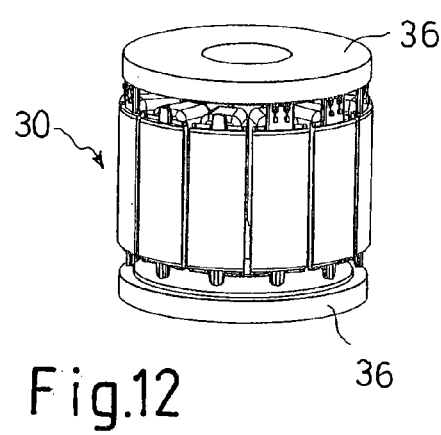
Figure 13:
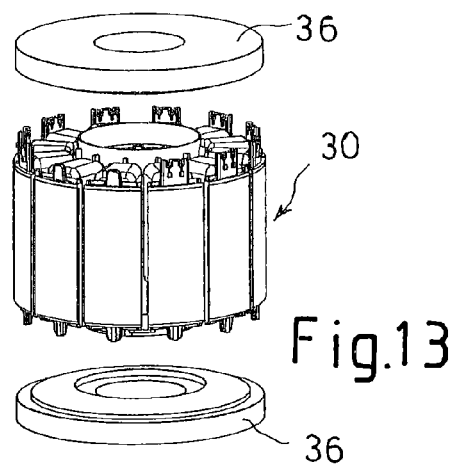
Figure 14:
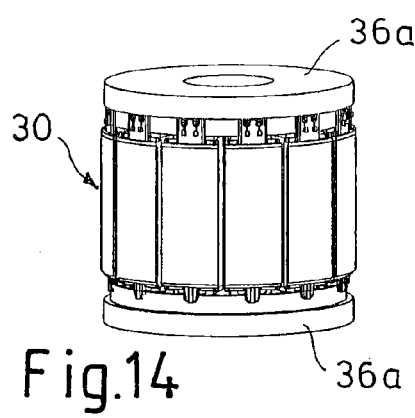
Figure 15:
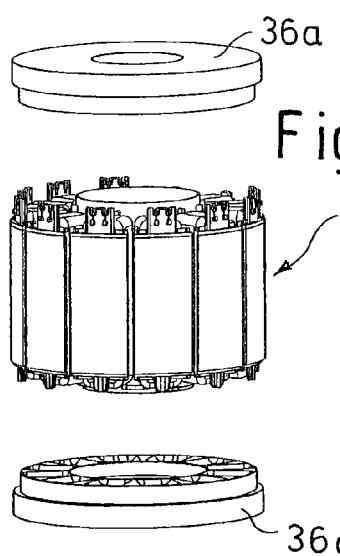
Figure 16:
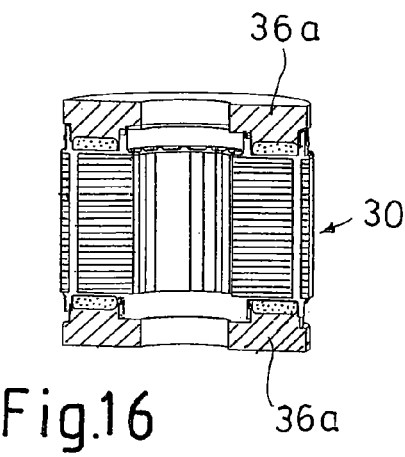
Figure 17:
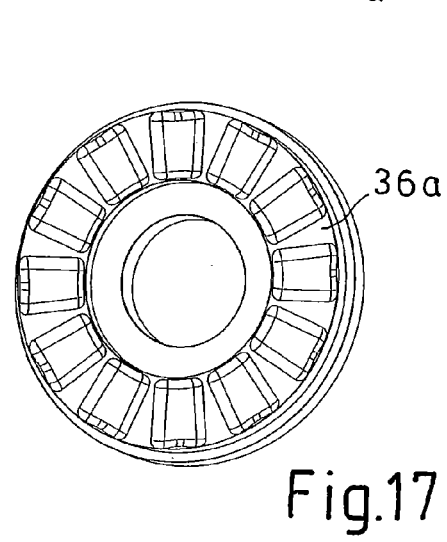

As first follows from FIGS. 12 and 13, the stator 30 can have, at least on its two axially opposite winding head sides, an annular disk-shaped compensation ring 36 made of a material with high magnetic permeability that covers the winding head area. This compensation ring 36 thus forms a soft magnetic return element. In the illustrated example, the stator 30 has such a compensation ring 36 on both axial sides. A compensation of the stray fluxes for rectified currents is achieved in all strands by the/each compensation ring 36 (similarly to the compensation in the interior of the stator core 32), so that the resultant inductance is reduced.

In the additional exemplary embodiment according to FIGS. 14 to 17, the stator 30 is additionally filled with a filling material of high magnetic permeability between the motor windings 34, likewise on at least one of the axially opposite sides, by means of casting or injection molding. This material can be, for example, a molding resin mixed with iron powder (ferrite powder). In this way, the compensation rings 36a can be directly formed by injection molding or casting, even if they are shown separately in FIGS. 15 and 17. By this "enveloping" of the wound stator 32, an improved fit between the motor windings and the magnetically permeable material is achieved, so that air gaps are minimized. In this way, a substantially stronger compensatory effect is achieved, so that the resultant inductance can be reduced still further.

Alternatively to the previously discussed measures, an increase of the stray inductances can also be achieved. In this regard, reference is made to FIGS. 18 to 23, according to which the stator 30, again on at least one of its two axially opposite winding head sides, axially has insertion parts 38 made of a material with high or low magnetic permeability between the/each motor winding 34 and the ferromagnetic stator core 32. With this measure, an amplified formation of stray fluxes (i.e., fluxes which in the case of rectified currents are not compensated in the strands) is effected by an increased (magnetic) distance between the respective winding 34 and the stator core 32. Depending on the magnetic permeability of the material used for the insertion parts 38, the occurring stray magnetic flux can be further increased (greater permeability brings about a greater magnetic stray flux), since a part of the length of the magnetic stray flux lines runs through a material of higher permeability than air.

In a further embodiment of this measure, it can be provided according to FIGS. 20 to 23 that the insertion parts 38 are formed as magnetically closed rings radially and axially enclosing the individual motor windings 34 in the winding head area. This can be achieved, for example, by arranging elongated sheet metal strips between the respective winding 34 and stator core 32. The elongated ends are then led around the winding head and bent together above the winding in order to form a magnetically closed ring. Thereby the stray field is led into this ring. The stray flux is increased by the increased permeability of the material. By forming a closed, magnetically permeable ring, a stronger induction increase is achieved than only by increasing the distance or inserting magnetically permeable material into the gap that is formed.

Figure 24:
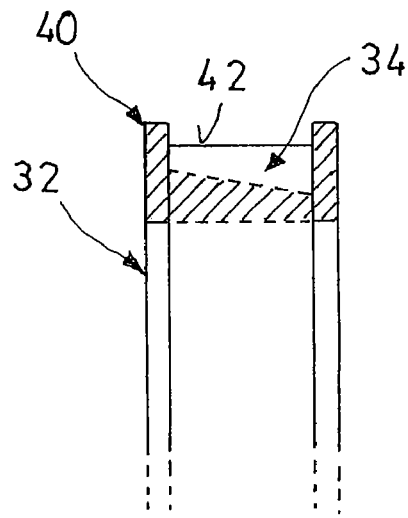
Figure 25:
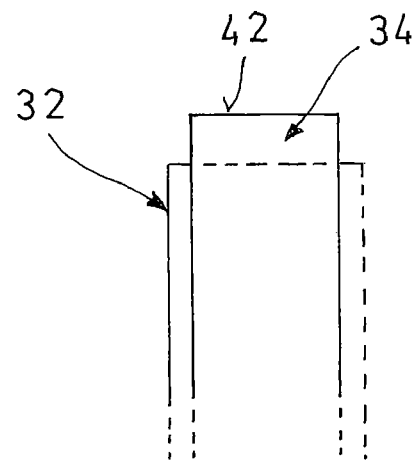
Figure 26:
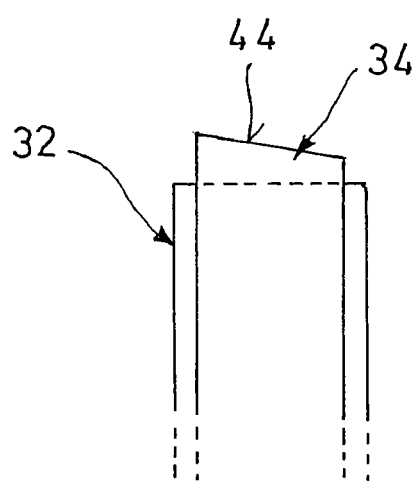
Figure 27:
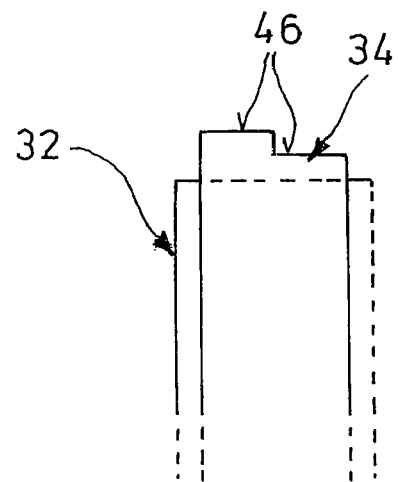

Finally, in addition to or alternatively to the previously described measures, the stray inductances of the winding heads can also be influenced by a special design of the geometry of the winding itself. In this regard, reference is made to FIGS. 24 to 27. The stray fluxes that are formed, i.e. the fluxes that are not compensated in the strands in case of rectified currents, are to be influenced by means of a specific design of the winding heads, i.e., a winding body 40 and/or the applied winding 34. Thus the winding body 40 as the support for the winding 34 can receive a special shape, which results in a change in the winding geometry and/or a change in the distances between the ferromagnetic stator core 32 and the individual windings of the winding package 34. Consequently, the formation of the stray fluxes and the effect as a stray inductance are influenced. In addition, the shape of the winding body 40 being the same, the shape of the winding 34 can be changed with a resultant change in the stray inductance. Some examples of modifications are shown in FIGS. 24 to 27. FIG. 24 shows a modification of the winding body 40 with a resulting change in the winding geometry and distance from the ferromagnetic stator core 32. FIGS. 25 to 27 show possible changes in the shape of the winding 34, the winding body 40 being the same, e.g., with a straight outer contour 42 running perpendicular to a motor axis (FIG. 25), with an outer contour 44 decreasing radially inwards or outwards (FIG. 26) and/or with a stepped outer contour 46 (FIG. 27).

Finally, it should be noted that all measures described on the basis of FIGS. 12 to 27 can be used both individually and in arbitrary and/or practical combinations.

The invention is not restricted to the illustrated and described exemplary embodiments, but comprises all embodiments with equal functions consistent with the invention. Furthermore, the invention has as yet not been limited to the combination of characteristics defined in the respective independent claim, but can also be defined by any arbitrary other combination of certain characteristics among all disclosed individual characteristics. This means that in principle practically every individual characteristic of the respective independent claim can be omitted or replaced by an individual characteristic disclosed at another point in the application. In this respect, the claims should be understood as a mere first attempt to formulate an invention.

The invention claimed is:

1. A method for driving a brushless, electronically commutated electric motor (2), of a three-strand motor type comprising the steps of providing a line AC voltage ($U_N$) which is rectified and fed via a slim DC link (8) with minimum DC link reactance as a DC link voltage ($U_Z$) to an inverter (10) that can be driven to supply and commutate the electric motor (2), a pulsating DC voltage ($U_G$) initially generated by rectifying the line AC voltage ($U_N$) is dynamically increased with respect to its instantaneous values in such a manner that the resulting DC link voltage ($U_Z$) with a reduced ripple lies above a defined limit voltage ($U_1/U_2$) over time, wherein the pulsating DC voltage ($U_G$) is converted using a step-up chopper (18) into the DC link voltage ($U_Z$), wherein the pulsating DC voltage ($U_G$) is applied at a pulse duty ratio regulated on the basis of the respective instantaneous DC link voltage ($U_Z$) to an inductor (L), wherein the DC link voltage ($U_Z$) is added up via a freewheeling diode (D) and a DC link capacitor ($C_{Zk}$) downstream of the inductor (L), and wherein stray inductances (Ls1-Ls3) of motor winding heads present in the motor (2) are used as the inductor (L) for the step-up chopper (18), and operation of the step-up chopper is performed only in the phases of the commutation control system of the inverter (10) in which all windings (U, V, W) of the electric motor (2) are short-circuited, and in that ordinary driving of the windings (U, V, W) for generating torque takes place in the other remaining phases of the commutation.

2. A method according to claim 1, further comprising in that the respective instantaneous DC link voltage ($C_{Zk}$) is supplied as an actual value to a voltage regulator (20) that drives an electronic switch (T9) for clocking the inductor (L) of the step-up chopper (18) as a function of the actual value of the DC link voltage ($U_Z$) and of the limit voltage ($U_1/U_2$), using pulse-width modulation.

3. A method according to claim 1, characterized further comprising in that the stray inductances (Ls1-Ls3) of the motor winding heads are increased or reduced, by additional measures with respect to their effective inductance (L).

4. A control system for a brushless electronically commutated, three-stranded electric motor (2), comprising, a network rectifier (6), a downstream slim DC link (8) with minimum DC link reactance and a controllable inverter (10) that can be supplied via the DC link and driven to commutate the electric motor (2), an integrated step-up chopper (18) with a controller (20) wherein a rectified pulsating DC voltage ($U_G$) rectified by the network rectifier (6) is dynamically increased with respect to its instantaneous values such that a DC link voltage ($U_Z$) therefore, resulting always lies with reduced ripple above a defined limit voltage ($U_1/U_2$), wherein the step-up chopper (18) has an inductor (L) in series with a freewheeling diode (D) and a downstream DC link capacitor ($C_{Zk}$), wherein the inductor (L) can be clocked by a controllable electronic switch (T9), to the pulsating DC voltage ($U_G$), and wherein the inductor (L) is formed from stray inductances (Ls1-Ls3) of motor winding heads present in the electric motor (2), the controller (20) only activates the step-up chopper (18) in the phases of commutation in which all windings (U, V, W) of the electric motor (2) are short-circuited.

5. A control system according to claim 4, characterized by further comprising a voltage regulator (20) which, as a function of the instantaneous DC link voltage ($U_Z$) and as a function of the predetermined limit voltage ($U_1/U_2$), drives the electronic switch (T9) using pulse width modulation to clock the inductor (L) at a variable pulse duty ratio.

6. A control system according to claim 4 further comprising additional means for influencing the effective inductance (L) of the stray inductances (Ls1-Ls3) of the winding heads arranged in the winding head area of the electric motor (2).

7. The control system according to claim 6 further comprising in that at least on one of its two axially opposite winding head sides, the electric motor (2) has a compensation ring (36) made of a material with high magnetic permeability that covers the winding heads.

8. A control system according to claim 6 further comprising in that at least on one of its two axially opposite winding head sides, the electric motor (2) is provided with a filling material with high magnetic permeability between the motor winding heads (34).

9. A control system according to claim 6 further comprising in that at least on one of its two axially opposite winding head sides, the electric motor (2) axially has insertion parts (38) made of a material with high or low magnetic permeability between the motor winding (34) and a ferromagnetic stator core (32).

10. The control system according to claim 9, further comprising in that the insertion parts (38) are configured as magnetically closed rings enclosing the individual motor windings (34) in the winding heads.

11. A control system according to claim 4 further comprising a geometrical design of the motor windings (34) in the winding heads for influencing the effective inductance (L) of the stray inductances of the winding heads (Ls1-Ls3).

\* \* \* \* \*